United States Patent
Sugimoto et al.

(10) Patent No.: US 8,737,486 B2
(45) Date of Patent: May 27, 2014

(54) OBJECTIVE IMAGE QUALITY ASSESSMENT DEVICE OF VIDEO QUALITY AND AUTOMATIC MONITORING DEVICE

(75) Inventors: Osamu Sugimoto, Saitama (JP); Sei Naito, Saitama (JP); Shigeyuki Sakazawa, Saitama (JP)

(73) Assignee: KDDI Corporation, Tokyo (JP)

( * ) Notice: Subject to any disclaimer, the term of this patent is extended or adjusted under 35 U.S.C. 154(b) by 698 days.

(21) Appl. No.: 13/048,331

(22) Filed: Mar. 15, 2011

(65) Prior Publication Data
US 2011/0228859 A1 Sep. 22, 2011

(30) Foreign Application Priority Data
Mar. 17, 2010 (JP) .................................. 2010-061103

(51) Int. Cl.
H04N 7/26 (2006.01)
(52) U.S. Cl.
USPC ................................. 375/240.24; 375/240.26
(58) Field of Classification Search
CPC .......................... H04N 19/002; H04N 7/26196
USPC ........................................ 375/240.24, 240.26
See application file for complete search history.

(56) References Cited

U.S. PATENT DOCUMENTS

2008/0317111 A1* 12/2008 Davis ............................. 375/227
2010/0054329 A1* 3/2010 Bronstein et al. ........ 375/240.03

FOREIGN PATENT DOCUMENTS

| JP | 2005142900 A | 6/2005 |
|---|---|---|
| JP | 2005527159 A | 9/2005 |
| JP | 2008-035357 | 2/2008 |
| JP | 2010-124104 | 6/2010 |

OTHER PUBLICATIONS

Rejection Notice for Japanese Patent Application No. 2010-061103, drafted May 10, 2013, dispatched May 15, 2013, 5 pages.
International Telecommunication Union, ITU-T Telecommunication Standardization Sector of ITU; H.262 (Jul. 1995), "Transmission of Non-Telephone Signals"; 211 pages.
International Telecommunication Union, ITU-T Telecommunication Standardization Sector of ITU; H.264 (Mar. 2010), "Series H: Audio-visual and Multimedia Systems—Infrastructure of audiovisual services—Coding of moving video", 676 pages.

(Continued)

*Primary Examiner* — Sath V Perungavoor
*Assistant Examiner* — Jeffery Williams
(74) *Attorney, Agent, or Firm* — Westman, Champlin & Koehler, P.A.

(57) ABSTRACT

An objective image quality assessment device of a video quality for estimating a subjective image quality from compressed bit stream is provided. The device includes a macro-block layer parameter analyzer for acquiring a quantizer scale size defined with respect to each macro-block and a coding type of a slice from a compressed bit stream, an orthogonal transformation coefficient in each macro-block, and a reference frame number in the macro-block applied with a motion compensating prediction, an average quantizer scale calculator for obtaining an average in a sequence of the quantizer scale size for every coding type of the slice, a spatial degradation feature calculator and a temporal degradation feature calculator for obtaining a spatial degradation feature and a temporal degradation feature, in each macro-block, and an image feature integrator for deriving the objective image quality based on the features obtained in the calculators.

11 Claims, 5 Drawing Sheets

(56) References Cited

OTHER PUBLICATIONS

International Telecommunication Union, ITU-T Telecommunication Standardization Sector of ITU; P.910 (Apr. 2008), "Series P: Telephone Transmission Quality, Telephone Installations, Local Line Networks—Audiovisual quality in multimedia services"; 42 pages.

International Telecommunication Union, ITU-T Telecommunication Standardization Sector of ITU; J.143 (May 2000), "Series J: Transmission of Television, Sound Programme and Other Multimedia Signals—Measurement of the quality of service", 15 pages.

International Telecommunication Union, ITU-T Telecommunication Standardization Sector of ITU; J.144 (Mar. 2004), "Series J: Cable Networks and Transmission of Television, Sound Programme and Other Multimedia Signals—Measurement of the quality of service", 156 pages.

International Telecommunication Union, ITU-T Telecommunication Standardization Sector of ITU; J.247 (Aug. 2008), "Series J: Cable Networks and Transmission of Television, Sound Programme and Other Multimedia Signals—Measurement of the quality of service", 108 pages.

International Telecommunication Union, ITU-T Telecommunication Standardization Sector of ITU; J.246 (Aug. 2008), "Series J: Cable Networks and Transmission of Television, Sound Programme and Other Multimedia Signals—Measurement of the quality of service", 42 pages.

"Methodology for the subjective assessment of the quality of television pictures", Rec. ITU-R BT.500.11, (1974-1978-1982-1986-1990-1992-1994-1995-1998-1998-2000-2002), 48 pages.

* cited by examiner

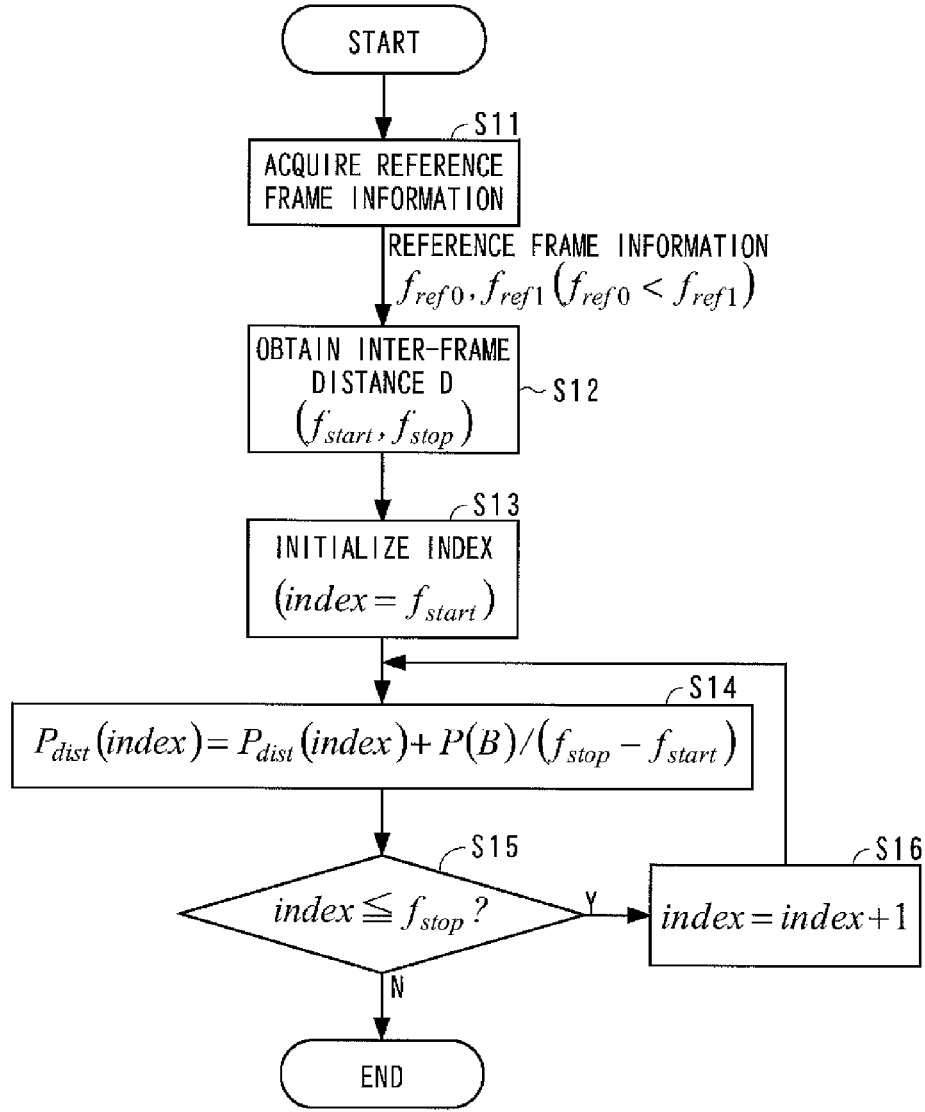

OBJECTIVE IMAGE QUALITY ASSESSMENT DEVICE OF VIDEO QUALITY AND AUTOMATIC MONITORING DEVICE

The present application is claims priority of Japanese Patent Application Serial No. 2010-061103, filed Mar. 17, 2010, the content of which is hereby incorporated by reference in its entirety.

BACKGROUND OF THE INVENTION

1. Field of the Invention

The present invention relates to an objective image quality assessment device of a video quality for assessing the quality of an image, degraded as a result of compression coding a video image, with only the compressed bit stream information without using the baseband information of a reference image and a decoded image, and an automatic monitoring device using the same.

2. Description of the Related Art

The amount of information is normally reduced through compression coding when storing and transmitting digital images. The compression coding referred to herein generally means an irreversible compression. The irreversible compression is a compression form of reducing the amount of information under the condition of sufficiently suppressing the visual degradation, that is, maintaining the image quality sufficiently high without completely rebuilding the original image when decoding the coded information (encoded bit stream). A typical example of the irreversible compression includes MPEG-2 and H.264 (non-patent documents 1, 2).

In the irreversible compression, the coding is carried out with the visual degradation sufficiently suppressed, as described above, but the degradation becomes visually recognized as the compression rate becomes high, that is, as the bit rate lowers. The irreversible compression also has a characteristic in that the extent of degradation that is visually recognized differs depending on the characteristics of the video such as fineness of the object, velocity and complicatedness of the movement, and the like in the screen even if the compression rate is the same. Thus, a technique of quantitatively measuring the degradation in image quality involved in the irreversible compression is desired.

The conventional image quality measurement has been carried out through a method called a subjective assessment. In this method, about twenty subjects are gathered and a video is presented to the subjects, where marks are given according to the subjective view of the subjects and the numerical value (e.g., average of mark) obtained by statistically processing such marks is defined as the quality of the video. A representative method of the subjective assessment method is defined in ITU-R recommendation BT.500-11, ITU-T recommendation P.910 and the like (non-patent documents 3, 4). However, the subjective assessment is not an easy method for assessing the video quality as the strict viewing conditions defined in the recommendation need to be satisfied and a great number of subjects need to be recruited.

Therefore, an object image quality assessment of extracting one or a plurality of numerical indices indicating the characteristic of the video called the video feature by analyzing the video signal, and deriving the quality of the video from the video feature is being reviewed. The image quality derived by the objective image quality assessment presumes the subjective image quality, and aims to be used as a substitute of the subjective image quality assessment.

In ITU-T J.143 (non-patent document 5), the framework of the objective image quality assessment method is defined. The framework of the objective assessment method is classified into the following three depending on the video of which stage, transmission or storage, to use for the assessment.

(1) Full Reference (FR) type: a method for using the baseband information of the original image before the compression coding and the decoded image (in case of storage), or the transmission image and the reception image (in the case of transmission).

(2) No Reference (NR) type: a method for using only the baseband information of the decoded image or the reception image (information of the original image or the transmission image is not used).

(3) Reduced Reference (RR) type: a method for using the image feature of the original image or the transmission image in which the amount of information is limited, and the baseband information of the decoded image or the reception image.

The Full Reference type has the highest estimation accuracy of the subjective image quality of the three frame works since the baseband image of before and after the storage or the transmission can be used. The No Reference type is inferior to the Full Reference in terms of accuracy since only the baseband image of after storage or transmission is used. The Reduced Reference type uses the image feature of the original image or the transmission image in addition to the baseband information of the decoded image or the reception image used in the No Reference type. The image feature is about a few dozen to a few hundred kbps, and is limited to a sufficiently small amount of information compared to the baseband information of the original image. In the RR type, the image feature on the transmission side is transmitted to the reception side using the data line prepared separate from the video line in time of video transmission in an aim of enhancing the estimation accuracy of the subjective image quality to higher than the NR type.

The objective assessment method based on the FR type among the three types of frame works includes the ITU-T recommendation J. 144 (non-patent document 6), the ITU-T recommendation J.247 (non-patent document 7), and Japanese Patent Application Laid-Open No. 2008-35357 (patent document 1). Non-patent document 6 shows the objective image quality assessment method targeting on the coding degradation of the standard television method (SDTV), and non-patent document 7 and patent document 1 show the objective image quality assessment method targeting on the video format often used in the multimedia application.

The ITU-T recommendation J.246 (non-patent document 8) is known for the objective assessment method based on the RR type. Non-patent document 8 discloses the objective assessment method based on the premise of the video format of the multimedia application.

Non-patent document 1: ITU-T Recommendation H.262, "Information technology-Generic coding of moving pictures and associated audio information: Video"

Non-patent document 2: ITU-T Recommendation H.264, "Advanced video coding for generic audiovisual services"

Non-patent document 3: Recommendation ITU-R BT. 500-11, "Methodology for the subjective assessment of the quality of television pictures"

Non-patent document 4: ITU-T Recommendation P.910, "Subjective video quality assessment methods for multimedia applications"

Non-patent document 5: ITU-T Recommendation J.143, "User requirements for objective perceptual video quality measurements in digital cable television"

Non-patent document 6: ITU-T Recommendation J. 144, "Objective perceptual video quality measurement techniques for digital cable television in the presence of a full reference"

Non-patent document 7: ITU-T Recommendation J.247, "Objective perceptual multimedia video quality measurement in the presence of a full reference"

Non-patent document 8: ITU-T Recommendation J. 246, "Perceptual audiovisual quality measurement techniques for multimedia services over digital cable television network in the presence of a reduced bandwidth reference"

Patent document 1: Japanese Patent Application Laid-Open No. 2008-35357

Japanese Patent Application No. 2008-29359, which is a prior application of the applicant, is known for the objective assessment method by the NR type. The NR type image quality assessment of the invention of the prior application is inferior to the FR type in terms of estimation accuracy of the subjective image quality since it does not use the information of the original image, but has an advantage in that the system configuration is simple since assessment with only the decoded image/reception image is possible. Such method is thus an effective method in the application of the transmission video monitoring.

In the invention of the prior application, the objective image quality is estimated by extracting temporal and spatial feature through analysis of the baseband signal of the decoded image, and integrating the same. The baseband signal enables fine analysis since the information in units of pixels can be acquired, but requires an enormous resource for the reading of the non-compressed signal having an enormous amount of information, storage to the memory, and the calculation process thereof. Therefore, the amount of information to be analyzed needs to be reduced, and consequently, the resources for calculation and information storage need to be reduced.

SUMMARY OF THE INVENTION

It is an object of the present invention to provide an object image quality assessment device of a video quality for estimating the subjective image quality not from the baseband signal of the decoded image but only from the compressed bit stream and the intermediate code information generated in the decoding process. Another object is to provide an objective image quality assessment device of a video quality of the NR type capable of estimating the subjective image quality at high accuracy, and an automatic monitoring device using the same.

In order to achieve the object, the present invention is firstly characterized in that an objective image quality assessment device of a video quality for estimating a subjective image quality of a video without using a reference image comprises a macro-block layer parameter analyzer for acquiring at least a quantizer scale size defined with respect to each macro-block and a coding type of a slice to which each macro-block belongs from a compressed bit stream, an average quantizer scale calculator for obtaining an average in a sequence of the quantizer scale size for every coding type of the slice, and an objective image quality deriving section for deriving the objective image quality with the average in the sequence of the quantizer scale size obtained by the average quantizer scale calculator as a feature, wherein the subjective image quality is estimated using only the compressed bit stream.

The present invention is secondly characterized in that the macro-block layer parameter analyzer acquires an orthogonal transformation coefficient in each orthogonal transformation block of each macro-block from the compressed bit stream, and a spatial degradation feature calculator for obtaining a spatial degradation feature in each macro-block from an average value of a DC component of the orthogonal transformation coefficient of each orthogonal transformation block acquired by the macro-block layer parameter analyzer is further arranged.

The present invention is thirdly characterized in that the macro-block layer parameter analyzer acquires an orthogonal transformation coefficient of each orthogonal transformation block and a reference frame number in the macro-block applied with the motion compensating prediction of each macro-block of the compressed bit stream, and a temporal degradation feature calculator for obtaining a temporal degradation feature based on a prediction error signal power averaged by an inter-frame distance which is obtained by the reference frame number acquired with the macro-block layer parameter analyzer is further arranged.

According to the first to third features of the present invention, the objective image quality assessment device capable of estimating the subjective image quality of a coded video through only the parameter extraction in the compressed bit stream without using not only the original image before the coding but also the baseband signal after the decoding is realized. In other words, the objective image quality assessment device capable of significantly saving the amount of the process compared to when processing the baseband image is provided.

Furthermore, a simple objective image assessment device of a video quality and an automatic monitoring device that uses only the reception side information are provided.

BRIEF DESCRIPTION OF THE DRAWINGS

FIG. 6 is a flowchart showing the details of step S5 in FIG. 5;

FIG. 7 is an explanatory view of the process of step S12 in FIG. 6;

DETAILED DESCRIPTION OF THE PREFERRED EMBODIMENTS

Figure 1:
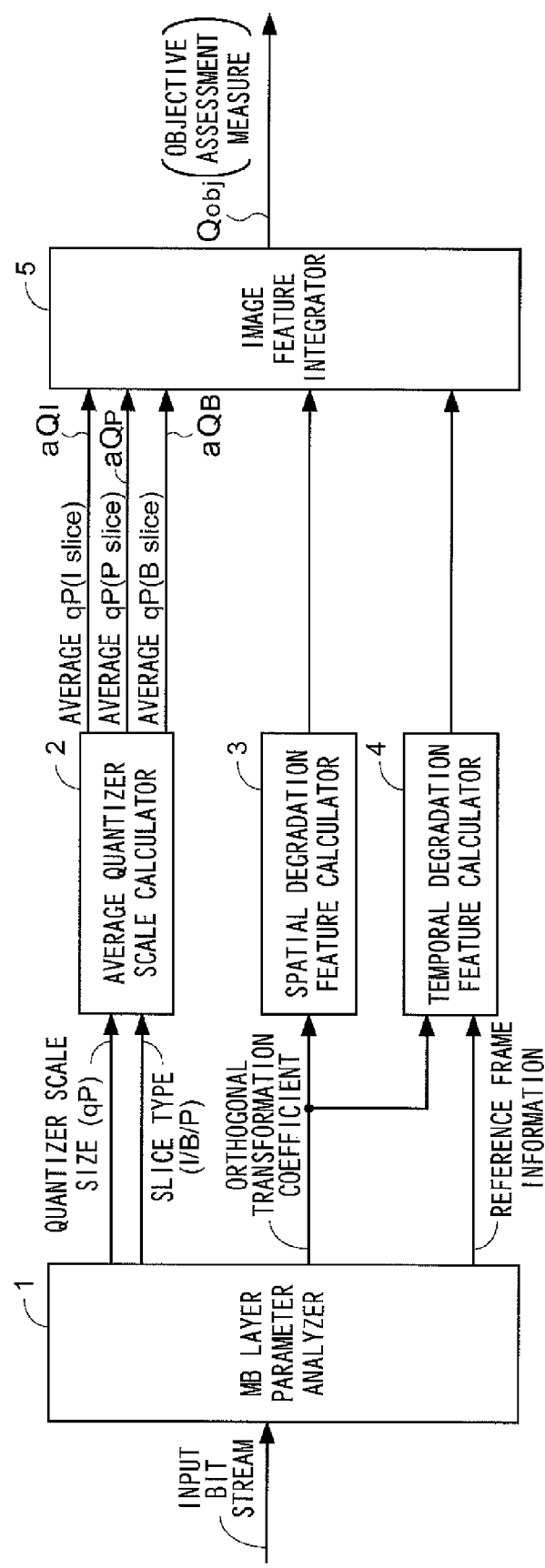
FIG. 1 is a block diagram showing a configuration of the outline of one embodiment of the present invention.

The present invention will be described in detail below with reference to the drawings. FIG. 1 is a block diagram showing the configuration of the outline of one embodiment of the present invention. This embodiment relates to an objective image quality assessment device of a video quality in which the compression coded bit stream information is the input and the objective assessment measure (i.e., total quality) is the output.

As shown in FIG. 1, the objective image quality assessment device is configured by an MB (Macro block) parameter analyzer 1, an average quantizer scale calculator 2, a spatial degradation feature calculator 3, a temporal degradation feature calculator 4, and an image feature integrator 5. The details on such processing units will be hereinafter described.

(A) MB Layer Parameter Analyzer 1

The MB layer parameter analyzer 1 receives the compression coded bit stream information (hereinafter referred to as "input bit stream"). The MB layer parameter analyzer 1 extracts the coded parameter information, which is intermediate code information generated in its decoding process, that is, the coded parameter information necessary in the average quantizer scale calculator 2, the spatial degradation feature calculator 3, and the temporal degradation feature calculator 4 of post-stage from the input bit stream. The coded parameter information acquired from the input bit stream includes the following.

(1) Quantizer scale size information (qp): this corresponds to the qp value (denominator of quantization) of the MB.

(2) slice type information: this information is one of I, P, B slices, where SI, SP slices are respectively interpreted as I, P slices.

(3) transformation coefficient: this is an orthogonal transformation coefficient in each orthogonal transformation block of the MB.

(4) reference frame information: the reference frame information is output only when the MB has a motion vector. If the MB is applied with bi-prediction, two reference frames are output in order of small reference number.

The coded parameter can be classified to when directly extracted from the bit stream and when acquired as the intermediate information at the time of decoding, but assumption is made that the method for extracting the information complies with the coding method since the type of compressed bit stream is not limited in the present invention, and the detailed description on such method will be omitted herein.

(B) Average Quantizer Scale Calculator 2

The quantizer scale information (qp) and the slice type information (I/B/P) of each MB are acquired from the MB layer parameter analyzer 1, and an inner sequence average value $aQ_I$, $aQ_P$, and $aQ_B$ of the quantizer scale size in each slice type (I, P, B) such as the average of the quantizer scale size in each slice type in a frame from the start to the end of the image to be assessed are obtained. The inner sequence average value of the quantizer scale size is known to have high correlation with the differential power (PSNR) between the original image and the decoded image. In the present invention, it is in principle, not possible to calculate the PSNR since the original image cannot be used, but the extent of degradation in the entire sequence can be grasped by utilizing the quantizer scale size.

(C) Spatial Degradation Feature Calculator 3

The spatial degradation feature calculator 3 is configured in an aim of providing the function corresponding to the block distortion feature calculator in non-patent document 3. In other words, the spatial degradation feature calculator 3 aims to output an index indicating the visual recognition extent of the block distortion on the decoded image. The block distortion is a common degradation factor in the coded image for performing processes in block units such as MPEG-2 and H.264, and the degree of such degradation is believed to have high correlation with the subjective image quality. The block distortion occurs when the signal value greatly changes at the boundary of the pixel blocks. In other words, the block distortion visually stands out when the DC component between the blocks is greatly changing.

In the present embodiment, the spatial degradation feature is defined by a differential root mean square value of the DC component between the adjacent 8×8 pixel blocks.

Figure 2:
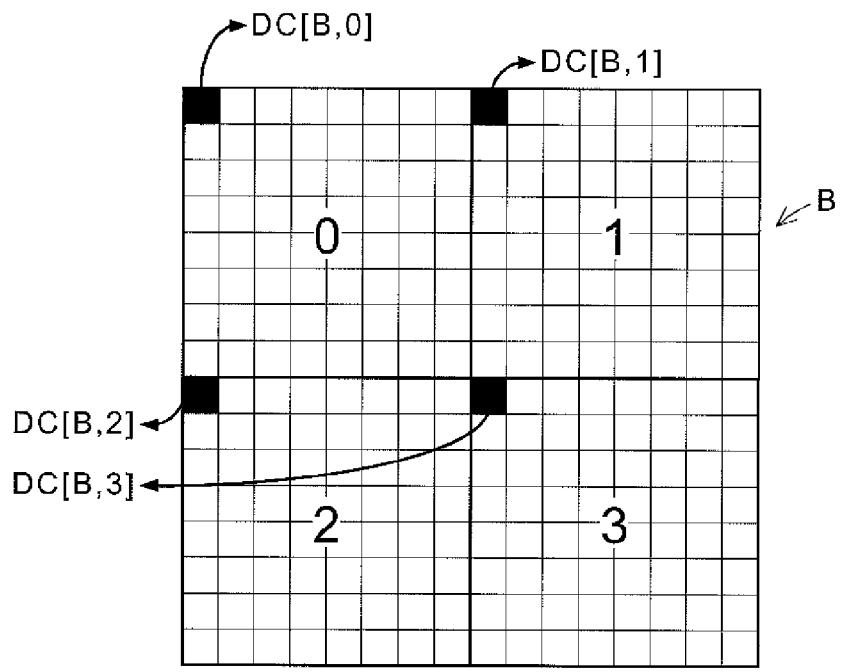
FIG. 2 is an explanatory view of a spatial degradation feature of a macro block (MB) in the 8×8 transformation block.

If the size of the orthogonal transformation block in the MB is 8×8, four orthogonal transformation blocks (0 to 3) exist in the MB(B), as shown in FIG. 2. Indicating the DC component of the orthogonal transformation blocks (0 to 3) as DC[B, S] (S=0, 1, 2, 3), the spatial degradation feature SI(B) in the MB(B) is defined with the following equation 1.

$$SI(B)=\{dDC[B,0,1]+dDC[B,0,2]+dDC[B,1,3]+dDC[B,2,3]\}/4 \quad \text{Equation 1}$$

here: $dDC[B,a,b]=\{DC[B,a]-DC[B,b]\}^2$

Figure 3:
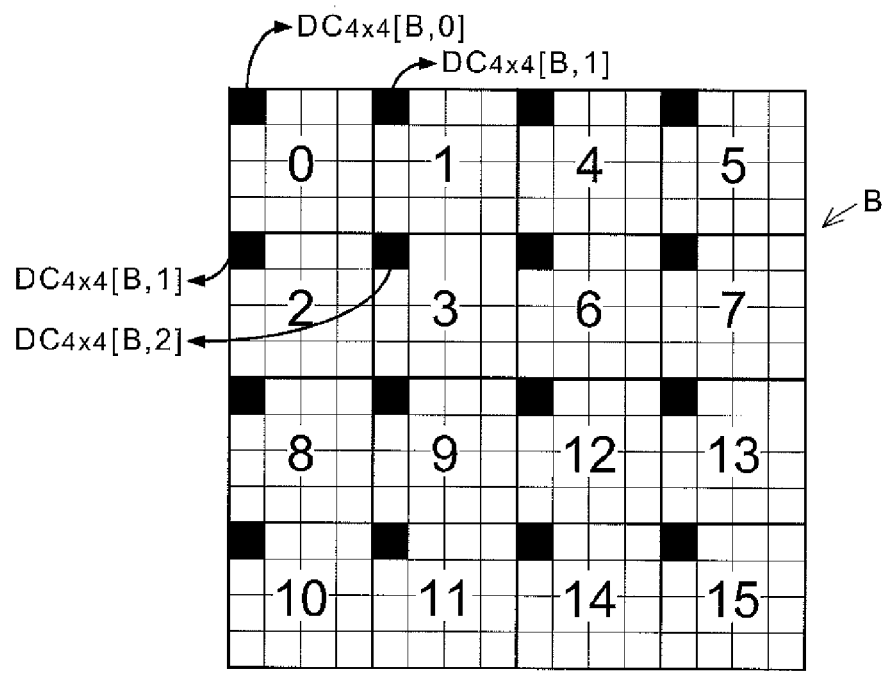
FIG. 3 is an explanatory view of a spatial degradation feature of a macro block (MB) in the 4×4 transformation block.

If the size of the orthogonal transformation block in the MB is 4×4, 16 orthogonal transformation blocks exist in the MB(B), as shown in FIG. 3. In this case, MB(B) is assumed to be configured with four 8×8 pixel blocks consisting of each set of block numbers {0, 1, 2, 3}, {4, 5, 6, 7}, {8, 9, 10, 11}, and {12, 13, 14, 15} rather than examining the DC component between the 4×4 transformation block boundaries, and the difference of the DC component between the 8×8 pixel blocks is obtained.

Figure 4:
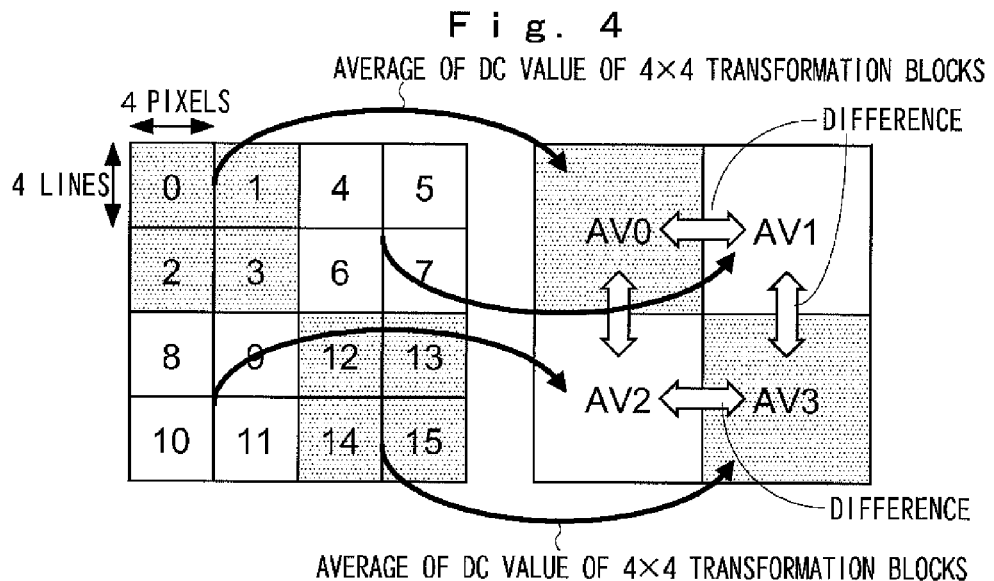
FIG. 4 is an explanatory view of a spatial degradation feature of a macro block (MB) in the 4×4 transformation block.

Specifically, (1) in the left diagram in FIG. 4, the average AV0 of the DC value of the four 4×4 transformation blocks of the block number {0, 1, 2, 3} is obtained. Similarly, the averages AV1, AV2, and AV3 of the DC values of the four 4×4 transformation blocks of each block number {4, 5, 6, 7}, {8, 9, 10, 11}, and {12, 13, 14, 15} are obtained. (2) As shown in the right diagram in FIG. 4, each average AV0 to AV3 is assumed as the DC value of the 8×8 pixel blocks, and the difference between the 8×8 pixel blocks is calculated.

The DC component DC[B, k] (k=0, 1, 2, 3) of the 8×8 pixel blocks when the size is 4×4 is expressed as in equation 2 below using the DC value $DC_{4\times4}[B, S]$ (S=0 to 15) in the 4×4 orthogonal transformation blocks.

$$DC[B, k] = \sum_{S=4k}^{4k+3} DC_{4\times4}[B, S]/4 \quad \text{Equation 2}$$

After the DC component DC[B, k] is obtained, the spatial degradation feature SI(B) is calculated using equation 1, similar to the case of the 8×8 transformation blocks.

Finally, the spatial degradation feature SI is defined by the average value of the spatial degradation features in all the MBs, that is, with equation 3.

$$SI = \sum_{B \in sequence} SI(B)/N_B \quad \text{Equation 3}$$

Here, $N_B$ is the total number of MBs in the sequence.
(D) Temporal degradation feature calculator 4

The temporal degradation feature calculator 4 is configured in an aim of providing the function corresponding to the flicker feature calculator in the non-patent document 3. In other words, the temporal degradation feature calculator 4 aims to output an index indicating the visual recognition extent of flicker disturbance on the decoded image. The flicker disturbance is the degradation detected when there is a large quality fluctuation for every cycle of intra-frame insertion of the motion compensating prediction coding, and is sensed when luminance change suddenly occurs between the consecutive frames. Similar to the block distortion, it is one of the video features that have high correlation with the subjective image quality.

In the temporal degradation feature calculator 4, the inter-frame difference of the luminance in each pixel block is defined as the temporal degradation feature to capture the temporal change in luminance value in the MB. The orthogonal transformation coefficient of each MB and the reference frame information in the motion compensation prediction are used as inputs for calculating the temporal degradation feature. The MB where the reference frame cannot be used is outside the feature calculation target.

Figure 5:
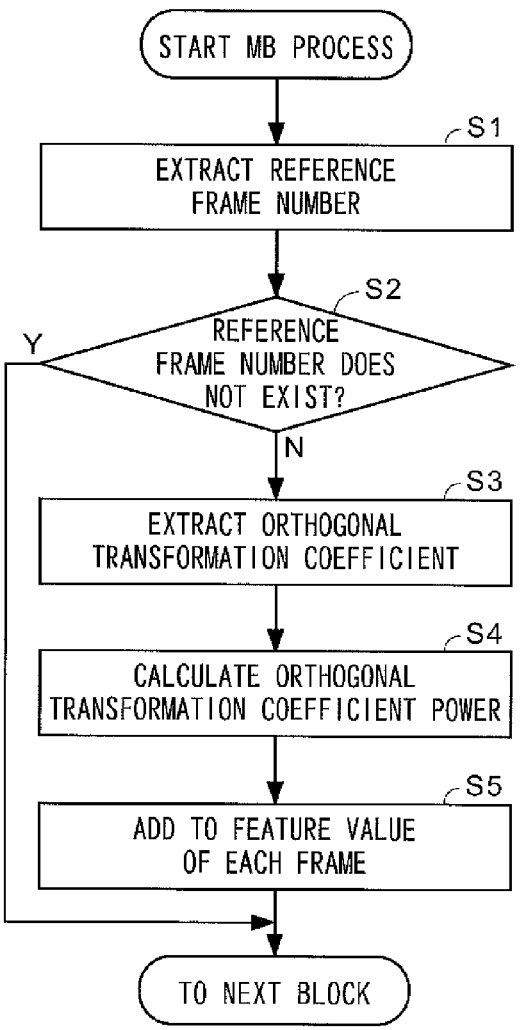
FIG. 5 is a flowchart showing one example of the process of the temporal degradation feature calculator.

The process of the temporal degradation feature calculator 4 will be described below with reference to FIG. 5. This process is based on the assumption of being processed in MB units, but this is not the sole case.

First, in step S1, a reference frame number in the MB to be processed is extracted. The reference frame number is the frame number which the image of P, B slice references. If the reference frame does not exist, the relevant block is assumed as outside the calculation target, whereby the determination of step S2 becomes positive and the process proceeds to the processing of the next block. If the reference frame exists, the process proceeds to steps S3, S4 to extract the orthogonal transformation coefficient of the relevant MB and calculate the power of the motion compensation prediction error signal. The power of the motion compensation prediction error signal can be obtained by root mean square of the orthogonal transformation coefficient.

The motion compensating prediction error signal power P(B) of the MB(B) is expressed with the following equation 4 when the MB is configured by 8×8 orthogonal transformation blocks.

$$P(B) = \sum_{S=0}^{Smax-1} \sum_{i=0}^{Nsize-1} \sum_{j=0}^{Nsize-1} |X_{B,S}(i,j)|^2 / Nsize^2 \qquad \text{Equation 4}$$

Here, $X_{B,S}(i, j)$ is the orthogonal transformation coefficient in the block (B,S), here S is a block number in FIG. 2 or 3, $S_{max}$ is the number of orthogonal transformation blocks in the MB($S_{max}$=4 if configured by 8×8 orthogonal transformation blocks, or $S_{max}$=16 if configured by 4×4 orthogonal transformation blocks), and $N_{size}$ is the size of the orthogonal transformation block ($N_{size}$=8 if configured by 8×8 orthogonal transformation blocks, or $N_{size}$=4 if configured by 4×4 orthogonal transformation blocks).

In step S5, the motion compensating prediction error signal power P(B) of the MB(B) that is obtained is added to the feature of each frame (motion compensating prediction error signal power P(B) already obtained). The details on the process of step S5 will be described below with reference to FIGS. 6, 7, and 8.

The motion compensating prediction error signal power can be assumed as the sum of the inter-frame differential power generated between the predictive frames of two frames obtained from the baseband signal. Thus, the inter-frame differential power in each frame can be obtained by equally distributing the power to the frame between the reference frames, and applying such operation to all the blocks applied with the motion compensating prediction in the frame.

First, the reference frame information is acquired in step S11 in FIG. 6. Assume that the number of reference frames is two at maximum, $f_{ref0}$ and $f_{ref1}$ (where $f_{ref0} < f_{ref1}$). The current frame is defined as $f_{cur}$ for the subsequent processes.

The process then proceeds to step S12, and the inter-frame distance D is obtained based on the reference frames $f_{ref0}$, $f_{ref1}$ and the current frame $f_{cur}$. Specifically, as shown in FIG. 7, the inter-frame distance D is obtained by ($f_{stop} - f_{start}$) where $f_{start}$, $f_{stop}$ are defined from the number of reference frames and the magnitude relationship of the reference frames $f_{ref0}$, $f_{ref1}$ and the current frame $f_{cur}$.

In other words, if bi-prediction is applied on the macro block and the reference frames in the bi-prediction are positioned in the opposite direction with each other with respect to the decoded image frame to which the macro block belongs, the inter-frame distance is obtained from the distance between two reference frames. If the two reference frames are positioned in the same direction respectively with respect to the decoded image frame to which the macro block belongs, the inter-frame distance is obtained by the distance between the reference frame, on the side of a greater distance with the decoded image frame to which the macro block belongs, of the two reference frames and the decoded image frame. If only one reference frame exists with respect to the macro block, the inter-frame distance is obtained by the distance between the relevant reference frame and the decoded image frame to which the macro block belongs.

In step S13, the index is initialized (index=$f_{start}$). In step S14, the MB power P(B) by root mean square of the orthogonal transformation coefficient obtained in equation 4 is divided by the inter-frame distance D, that is, ($f_{stop} - f_{start}$) and averaged, and the resultant value is distributed to the array $P_{dist}(\ )$ for integrating the power value of each frame. The index of the frame number is described in the parentheses of the array $P_{dist}(\ )$. The array $P_{dist}(\ )$ is based on the assumption that the orthogonal transformation coefficient powers of all frames are initialized to zero prior to the processing of the sequence head frame. In step S15, whether index≤$f_{stop}$ is satisfied is determined, where the process proceeds to step S14 if satisfied to increment the index value. The processes of steps S14, S15, and S16 are repeated until the determination of step S15 is negative. Through such processes, the power average value P(B) ($f_{stop} - f_{start}$) is added to the element of $P_{dist}$(index). Step S5 described above is thereby realized.

Figure 8:
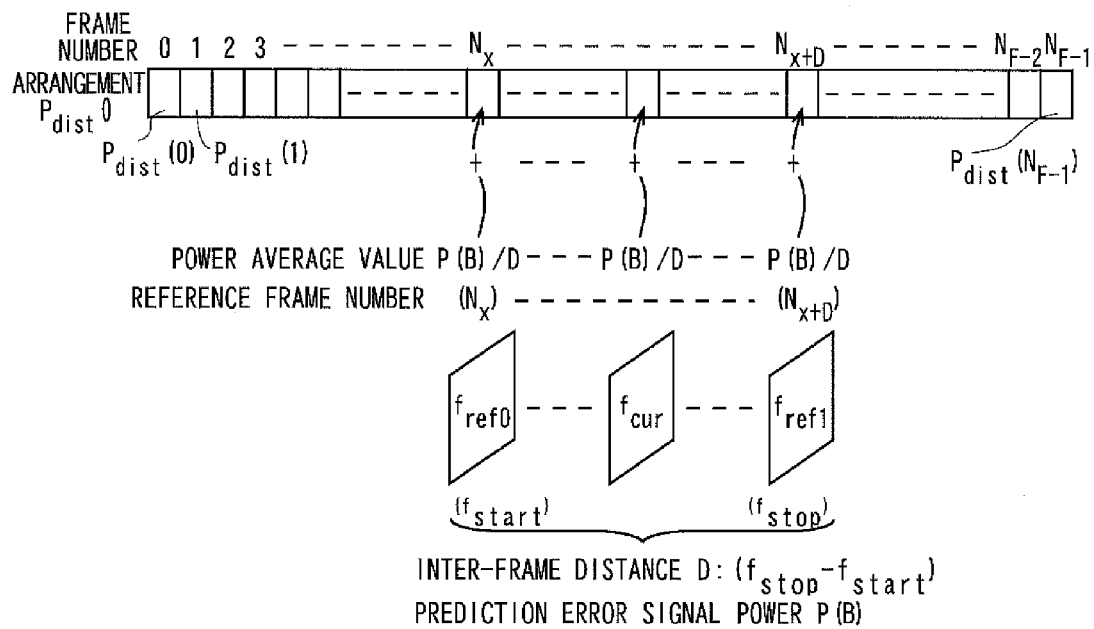
FIG. 8 is an explanatory view of the process in FIG. 6.

Describing the above processes in FIG. 8, if there is the array $P_{dist}(\ )$ of the frame numbers 0 to $N_{F-1}$, all elements of the array $P_{dist}(\ )$ are initialized to 0 prior to the processing of the sequence head frame. The inter-frame distance D is ($f_{stop} - f_{start}$) assuming the reference frame of the current frame $f_{cur}$ is $f_{ref0}(f_{start})$, $f_{ref1}(f_{stop})$. If the reference frame number of $f_{ref0}$ is $N_X$, the reference frame number of $f_{ref1}$ is $N_{X+D}$, and the prediction error signal power is P(B), in step 14, the power average value is calculated by P(B)/D, and the power average value is added to each array $P_{dist}(N_X)$ to $P_{dist}(N_{X+D})$ of the reference frame numbers $N_X$ to $N_{X+D}$.

Finally, the temporal degradation feature is obtained by the average of all elements of the array $P_{dist}(\ )$. Assuming the number of all elements of the array $P_{dist}(\ )$ is $N_F$, the temporal degradation feature TI is expressed with the following equation 5.

$$TI = \sum_{f=0}^{N_F-1} P_{dist}(f)/N_F \qquad \text{Equation 5}$$

(E) Image feature integrator (or objective image quality deriving section) 5

The image feature integrator 5 integrates each feature of the average value {average qp (I slice), average qp (P slice), average qp (B slice)} of the quantization scale by slice type, the spatial degradation feature, and the temporal degradation feature, and derives the objective image quality or obtains the objective assessment measure. Assuming the average value of the quantization scale in the slice types I, B, P is $aQ_I$, $aQ_P$, $aQ_B$, the spatial degradation feature is SI, and the temporal degradation feature is TI, the objective assessment measure $Q_{obj}$ is obtained with equation 6.

$$Q_{obj} = f(aQ_I, aQ_P, aQ_B, SI, TI) \quad \text{Equation 6}$$

Here, f( ) represents a given function. The most suitable approximate expression differs depending on conditions such as an image format to be assessed, a coding method, and a coding bit rate, and thus a function in which the correlation with the subjective assessment value becomes a maximum under such conditions is selected.

As one example of the function f( ), an expression expressed with the weighted sum such as equation 7 can be selected with wi (i=0 to 4) as the weight coefficient.

$$Q_{obj} = w_0 SI + w_1 TI + w_2 aQ_I + w_3 aQ_B + w_4 aQP \quad \text{Equation 7}$$

As another example of the function f( ), an approximate expression expressed with equation 8 can be selected with wi (i=0 to 4), $\gamma_j$ (j=1, 2) as the weight coefficient.

$$Q_{obj} = (w_0 SI^{\gamma 1} + w_1 TI^{\gamma 1} + w_2 aQ_I^{\gamma 1} + w_3 aQ_B^{\gamma 1} + w_4 aQP^{\gamma 1})^{\gamma 2} \quad \text{Equation 8}$$

The wi (i=0 to 4), $\gamma_j$ (j=1, 2) in the above equation is set such that the correlation of the objective assessment value $Q_{obj}$ and the subjective assessment value becomes a maximum. In other words, for the approximate function for deriving the objective image quality, it can be carried out using a number in which the weighted sum, of the number in which each feature is raised with the power index $\gamma_1$, is raised with the power index $\gamma_2$ different from the former power index.

The correlation of the objective assessment value and the subjective assessment value can be obtained by performing regression analysis on the series of the objective assessment value and the series of subjective assessment value obtained using a plurality of assessment videos.

Figure 9:
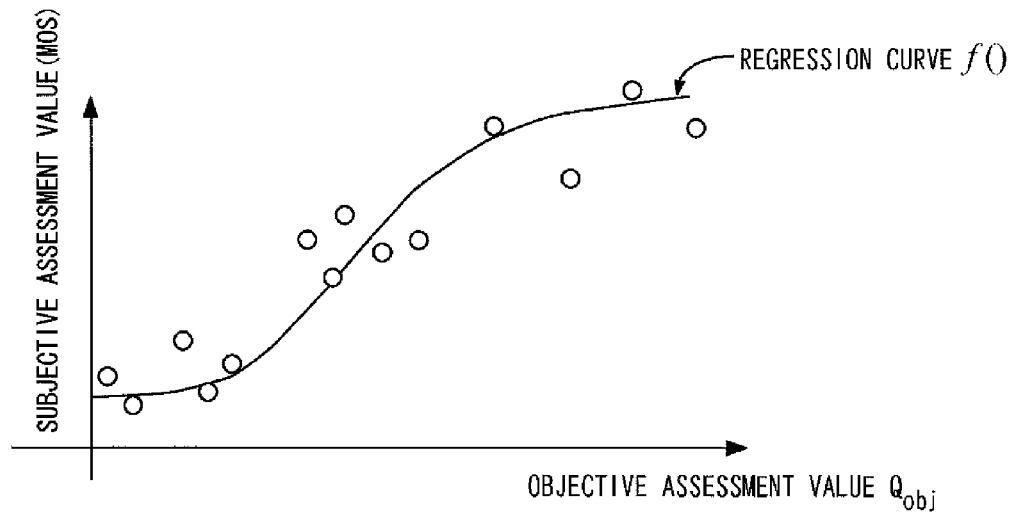
FIG. 9 is an explanatory view of regression analysis.

One example of the regression analysis will be described with reference to FIG. 9. If each data series is plotted with the objective assessment value on the horizontal axis and the subjective assessment value on the vertical axis as in FIG. 9, they can be approximated with the regression curve. The nonlinear function such as a high degree polynomial and a logistic function can be applied other than a linear function for the regression curve. The purpose of the objective image quality assessment is to estimate the subjective assessment value, where the performance of the estimation is higher if accuracy of approximation by the regression curve is higher, that is, the distance of each plot point on the graph and the regression curve is shorter.

In the above-described embodiment, the average quantizer scale calculator 2, the spatial degradation feature calculator 3, and the temporal degradation feature calculator 4 are used, but the present invention is not limited thereto, and one or a plurality of them may be used. For instance, satisfactory objective assessment can be carried out even by using only the average quantizer scale calculator 2. Furthermore, satisfactory objective assessment can be carried out even by using the average quantizer scale calculator 2 and the spatial degradation feature calculator 3 or the temporal degradation feature calculator 4.

When the objective assessment measure $Q_{obj}$ is obtained from the image feature integrator 5, the automatic monitoring of the video quality can be carried out by automatically monitoring and assessing the objective assessment measure $Q_{obj}$. For instance, the objective assessment measure $Q_{obj}$ is automatically recorded and left, or when the quality is worse than the given video quality, processes such as outputting an alarm can be performed.

What is claimed is:

1. An objective image quality assessment device of a video quality for estimating a subjective image quality of a video without using a reference image, the objective image quality assessment device comprising:
   a macro-block layer parameter analyzer for acquiring at least a quantizer scale size defined with respect to each macro-block and a coding type of a slice to which each macro-block belongs from a compressed bit stream;
   an average quantizer scale calculator for obtaining an average in a sequence of the quantizer scale size for every coding type of the slice; and
   an objective image quality deriving section for deriving the objective image quality with the average in the sequence of the quantizer scale size obtained by the average quantizer scale calculator as a feature, wherein
   the subjective image quality is estimated using only the compressed bit stream.

2. The objective image quality assessment device according to claim 1, wherein
   the macro-block layer parameter analyzer acquires at least one of orthogonal transformation coefficients in each orthogonal transformation block of each macro-block from the compressed bit stream, and
   a spatial degradation feature calculator for obtaining a spatial degradation feature in each macro-block from an average value of a DC component of the orthogonal transformation coefficient of each orthogonal transformation block acquired by the macro-block layer parameter analyzer is further arranged.

3. The objective image quality assessment device according to claim 1, wherein
   the macro-block layer parameter analyzer acquires an orthogonal transformation coefficient of each orthogonal transformation block and a reference frame numbers in the macro-block applied with the motion compensating prediction of each macro-block of the compressed bit stream, and
   a temporal degradation feature calculator for obtaining a temporal degradation feature based on a prediction error signal power averaged by an inter-frame distance which is obtained by the reference frame numbers acquired with the macro-block layer parameter analyzer is further arranged.

4. The objective image quality assessment device according to claim 2, wherein
   the macro-block layer parameter analyzer acquires an orthogonal transformation coefficient of each orthogonal transformation block and reference frame numbers in the macro-block applied with the motion compensating prediction of each macro-block of the compressed bit stream, and
   a temporal degradation feature calculator for obtaining a temporal degradation feature based on a prediction error signal power averaged by an inter-frame distance which is obtained by the reference frame numbers acquired with the macro-block layer parameter analyzer is further arranged.

5. The objective image quality assessment device according to claim 3, wherein
   the inter-frame distance is provided by a distance between two reference frames if bi-prediction is applied on the macro block and the reference frames in the bi-prediction are positioned in opposite directions with each other with respect to a decoded image frame to which the macro-block belongs, and if the two reference frames are positioned in the same direction respectively with respect to the decoded image frame to which the macro block belongs, the inter-frame distance is obtained by a distance between the reference frame, on a side of a greater distance with the decoded image frame to which the macro block belongs, of the two reference frames, and the decoded image frame.

6. The objective image quality assessment device according to claim 4, wherein the inter-frame distance is provided by a distance between two reference frames if bi-prediction is applied on the macro block and the reference frames in the bi-prediction are positioned in opposite directions with each other with respect to a decoded image frame to which the macro-block belongs, and if the two reference frames are positioned in the same direction respectively with respect to the decoded image frame to which the macro block belongs, the inter-frame distance is obtained by a distance between the reference frame, on a side of a greater distance with the decoded image frame to which the macro block belongs, of the two reference frames, and the decoded image frame.

7. The objective image quality assessment device according to claim 3, wherein the inter-frame distance is given by a distance between the reference frame and the decoded image frame to which the macro block belongs if only one reference frame exists with respect to the macro block.

8. The objective image quality assessment device according to claim 5, wherein the inter-frame distance is given by a distance between the reference frame and the decoded image frame to which the macro block belongs if only one reference frame exists with respect to the macro block.

9. The objective image quality assessment device according to claim 1, wherein the objective image quality deriving section uses a weighted sum of each feature as an approximate function for deriving the objective image quality.

10. The objective image quality assessment device according to claim 1, wherein the objective image quality deriving section uses a number obtained by calculating a weighted sum of a number in which each feature is raised to a power index and raising the weighted sum to another power index as an approximate function for deriving the objective image quality.

11. An automatic monitoring device of a video quality comprising the objective image quality assessment device according to claim 1.

* * * * *